April 1, 1924.
D. C. BRANDENBURG
INDICATOR FOR MOTOR VEHICLES
Filed March 17, 1922
1,489,060
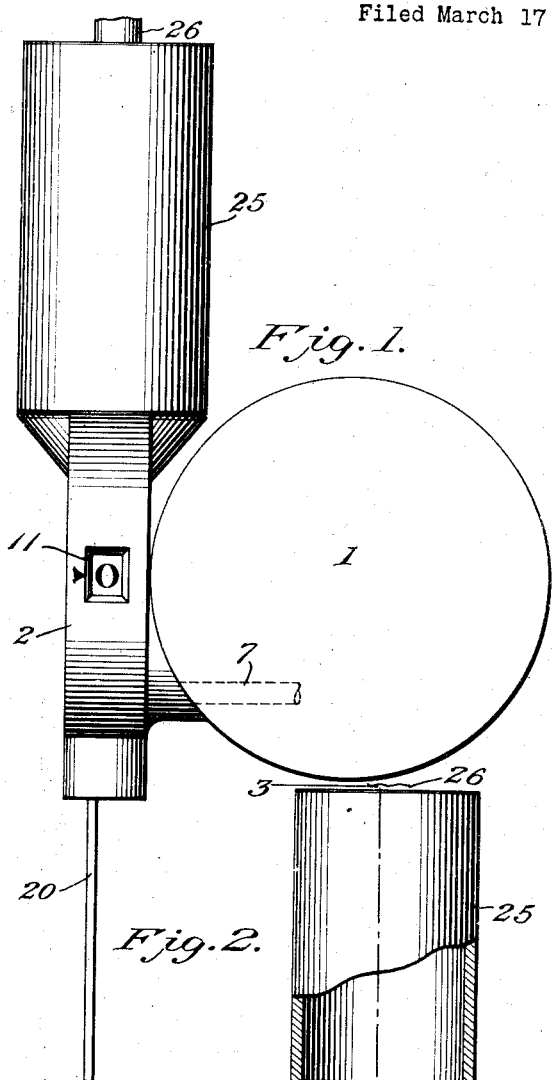
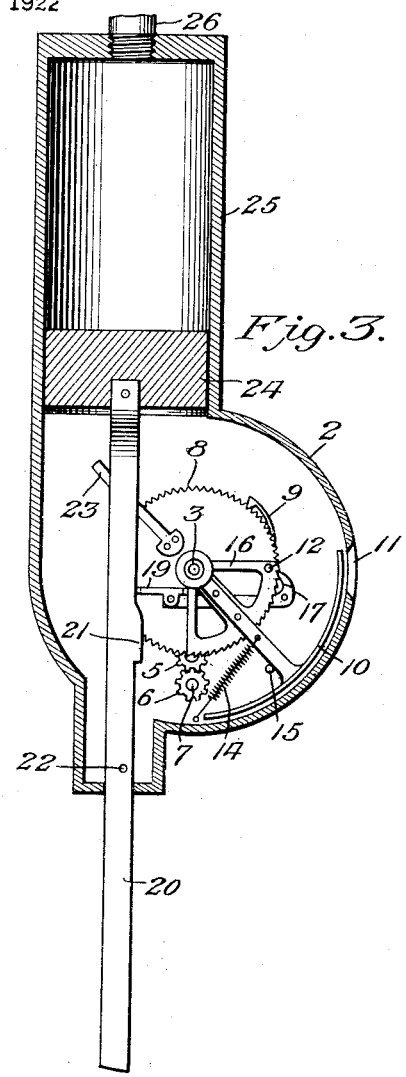
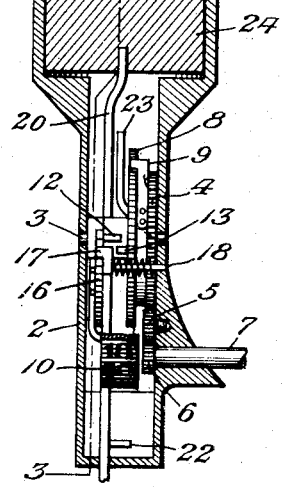
INVENTOR.
Dudley C. Brandenburg
BY E. C. Brandenburg
his ATTORNEY Patented Apr. 1, 1924.

1,489,060

UNITED STATES PATENT OFFICE.

DUDLEY C. BRANDENBURG, OF DENVER, COLORADO.

INDICATOR FOR MOTOR VEHICLES.

Application filed March 17, 1922. Serial No. 544,696.

*To all whom it may concern:*

Be it known that I, DUDLEY C. BRANDENBURG, a citizen of the United States, residing at Denver, in the county of Denver, and State of Colorado, have invented certain new and useful Improvements in Indicators for Motor Vehicles, of which the following is a specification.

This invention relates to a device for registering the rate of fuel consumption of an automobile of the like, with the speed of the mechanism and the object of the invention is to so combine a speed indicator with a fuel consuming indicator as to mechanically compute and show on a dial the gasoline or other fuel consumption in exact terms of miles per gallon.

In the accompanying drawings:

Figure 1 is a side elevation of the device;

Fig. 2 is a similar view with parts in section to more clearly disclose the invention; and, Fig. 3 is a sectional view taken on line 3—3 of Fig. 2.

This invention consists of a registering dial, which is actuated by suitable means connected with the mechanism of the usual speedometer, in combination with an independent actuating mechanism controlled by the vacuum feed system, such as the so-called Stewart vacuum system or any other vacuum system of the same principle.

This vacuum system, it is understood, has a float in the vacuum tank which rises and falls with the passage of gasoline or other fuel through it. It so happens that each time the float in this vacuum tank completes a full travel or stroke, a fixed amount of fuel, equal with each stroke, has passed through such tank regardless of speed or rate of consumption. It is further understood that when the float in the vacuum tank reaches the bottom of its stroke, a valve in such tank is opened, admitting the suction of the engine therein, which suction is utilized to draw into the tank a fresh supply of gasoline or other fuel. As such suction occurs simultaneously with the above stated action of the float, as a result thereof, and as frequently but not more so, it follows that each occurrence of the suction indicates, precisely the same as the action of the float itself, that a definite fixed amount of fuel, equal with each suction, has passed through the tank, and this amount of fuel is, under the circumstances, the amount received in the tank as a result of the action of the float.

It is therefore desired to make use of this vacuum tank as a gasoline or other fuel measuring device, and to use the frequency of the occurrence to indicate the frequency with which such tank is filled and emptied, and consequently, the frequency with which such gasoline or other fuel is measured by the tank. It is also further desired to utilize the occurrence of the suction, by means of a connecting pipe line in conjunction with the usual speedometer, to mechanically compute and show on a dial the gasoline or other fuel consumption in terms of miles per gallon.

In the drawings the numeral 1 indicates the center casing of the speedometer. Integral with this casing is a casing 2 which, as hereinafter described, contains the mechanism illustrating my computing device.

The numeral 3 indicates a shaft supported in the casing 2, journaled upon this shaft is a gear wheel 4 with the idle gear 5 carried by the casing which in turn meshes with a pin 6 rotatably mounted in the casing 2 adapted to be driven from a drive shaft 7 which derives its power from the speedometer mechanism in such a manner as to be continuously driven by the machine. Rotatably mounted upon the shaft 3 is a ratchet wheel 8 adapted to be actuated by ratchet dog 9 carried by the gear wheel 4. The numeral 10 indicates an integral segmental wheel rotatably mounted upon the shaft 3, the periphery of which is provided with indicating symbols, in this instance, which are visible through an opening 11 in the casing 2. Carried by the integral wheel 10 is a pin 12 adapted to be engaged by a similar pin 13 carried by the ratchet wheel 8, said indicating wheel being held normally in its lower position by a spring 14, its downward movement being limited by a pin 15. Thus as the ratchet wheel 8 is rotated the segmental indicating wheel 10 is moved upwardly exposing the numerals on the periphery thereof through the opening 11. The numeral 16 indicates a segmental ratchet wheel carried by the segmental indicating wheel 10, engaging this segmental ratchet wheel is a dog 17 pivotedly mounted upon a stationary base 18 secured to the casing 2. The inner end of the dog 17 is provided with a flexible finger 19 adapted to be engaged by a reciprocating rod 20 provided with a notch 21 to engage said flexible finger 19 as it is moved upwardly causing the dog 17 to release the segmental ratchet wheel 16 permitting it to drop back to a normal position. Carried by the reciprocating rod 20 is a pin 22 which engages an arm 23 carried by the ratchet wheel 8, said pin adapted to cause the ratchet wheel 8 to be moved in a clock-wise direction and brought back to its normal position.

To reciproate the reciprocating rod at predetermined times and in harmony with the vacuum tank as described I preferably provide a piston 24 arranged in a cylinder 25, the upper end of said cylinder being connected by a conduit 26 to the vacuum tank (not shown).

The mile indicating wheel 10 is so constructed as to make its full travel in one quarter of a circle, and is therefore geared in reduction, four to one, to the drive shaft 7. It is therefore seen that if the drive shaft 7 makes one revolution with one mile of travel of the car or other vehicle, the mile wheel 10 makes a fourth of a revolution of travel of the car or other vehicle.

Now, as this mile or indicating wheel 10 makes its complete travel in one mile of distance covered by the car or other vehicle, and assuming in making this travel the vacuum tank has emptied once and that each time the float drops one fifth of a pint of fuel has passed through the tank, then we could get the following equation, namely, one mile per one fifth of a pint of fuel equal to forty miles per gallon. Now, if this mile or indicating wheel is marked off in units of the above equation, we will find that if the indicating wheel only covers one fifth of its travel by the time the vacuum tank float has moved once, we get the equation, one fifth of a mile per one fifth of a pint of fuel equals eight miles per gallon, and the reading will show eight miles per gallon.

The operation is as follows: Assuming the indicating wheel 10 is already in such position as to show eight miles per gallon through the opening in the face of the instrument, it is held in this position by the little dog 17 which engages the ratchet wheel 16 carried by the indicating wheel 10. It will be seen that the ratchet wheel 16 and the ratchet wheel 8 must both turn at the same speed, as the former is pushed by the latter by means of lugs 12 and 13. Assuming that the ratchet wheel 8 has been pulled back to the starting point, it is slowly moved forward again by the gear wheel 4 which is being continuously actuated by the pinion 6 actuated by the speedometer through the drive shaft 7. Assuming that the ratchet wheel 8 has gotten just one half as far as the indicating wheel 10 which is standing at eight miles per gallon, when the vacuum tank float admits the engine suction, causing the plunger 24 to rise, thereby actuating the tripping rod 20, it is so arranged that the tripping rod 20 comes in contact with the rear end of the dog 17 which holds the indicating wheel at eight miles per gallon. The indicating wheel 10 at once springs back by means of a spring 14 until the stud 12 thereon comes in contact with the stud 13 carried by the ratchet wheel 8. The indicating wheel will then read half the previous reading, namely, four miles per gallon. In the mean time the tripping rod 20 is carried upwardly and engages the dog 17, the latter holding the indicating wheel at a new reading and by means of the pin 22 striking the arm 23 integrally with the ratchet wheel 8 and pulls the ratchet wheel 8 back to the starting point, the ratchet wheel 8 being allowed to return by means of the resilient dog 9 integral with the gear wheel 4. Now, suppose the next time it acts instead of going half way the ratchet wheel 8 goes further and carries the indicating wheel 10 by means of the studs 12 and 13 until it reads twelve miles per gallon. The vacuum tank again acts, and the tripping mechanism 20 releases the dog 17 on the segmental ratchet wheel 16 just as before. The indicating wheel cannot go back because the stud 13 on the ratchet wheel 8 is in contact with the stud 12 carried by the segmental ratchet wheel 16 and the indicating wheel 10 is therefore held in that position by the dog 17 which has been released by the actuating rod 20, the pin 22 engages the arm 23 carried by the ratchet wheel 8 rotating the ratchet wheel 8 in a clock-wise direction back to the initial starting point. In this way the fuel consumption in terms of miles per gallon is mechanically shown on a dial at all times as the machine proceeds.

I claim:

1. An indicator for motor vehicles comprising a rotary element arranged to be continuously operated by the vehicle, a ratchet-wheel mounted concentrically therewith, a pawl carried by the rotary element and engaging said ratchet-wheel, a rotating indicating segment mounted concentrically with the ratchet-wheel engaging pins carried by said indicating segment and ratchet-wheel, a ratchet-wheel carried by said indicating segment, a pawl adapted to retain said indicating segment in the position to which it is moved by the first-mentioned ratchet-wheel, means actuated by suction occurring periodically in the vacuum tank to rotate the second-mentioned rotary element in a reverse direction at intervals.

2. An indicator for motor vehicles comprising a rotary element arranged to be continuously operated by the vehicle, a ratchet-wheel mounted concentrically therewith, a pawl carried by the rotary element and engaging said ratchet-wheel, a rotating indicating segment mounted concentrically with the ratchet-wheel engaging pins carried by said indicating segment and ratchet-wheel, a ratchet-wheel carried by said indicating segment, a pawl engaging said last-mentioned ratchet-wheel adapted to retain said indicating segment in the position to which it is moved by the first-mentioned ratchet-wheel, means actuated by the suction occurring periodically in the vacuum tank of the vehicle to rotate the first-mentioned rotary element in a reverse direction at intervals, and means actuated by the last-mentioned actuating means for releasing the indicating means at intervals.

3. An indicator for motor vehicles comprising a casing, a shaft journaled therein, a rotary member rotatably mounted thereon arranged to be operated by the vehicle, a ratchet wheel rotatably mounted on said shaft, a pawl carried by said rotary member adapted to engage said ratchet-wheel, an indicating segment provided with indicating marks rotatably mounted on said shaft, engaging pins carried by said ratchet-wheel and said indicating members, a segmental ratchet-wheel carried by said indicating segment, a pivoted dog engaging said segmental ratchet-wheel, a reciprocating member actuated by the suction occurring periodically in the vacuum tank of the vehicle, an arm projecting outwardly from the first-mentioned ratchet wheel arranged to be actuated by said reciprocating member at intervals to reverse the movement of said ratchet-wheel, means carried by the pawl engaging said segmental ratchet-wheel carried by said indicating segment arranged to be tripped by said reciprocating means for releasing said indicating segments.

In testimony whereof I affix my signature.

DUDLEY C. BRANDENBURG.